US006369156B1

(12) United States Patent
Cron

(10) Patent No.: US 6,369,156 B1
(45) Date of Patent: Apr. 9, 2002

(54) POLYURETHANE/POLYUREA-FORMING COMPOSITIONS

(75) Inventor: Stéphane Cron, Cambridge (GB)

(73) Assignee: Vantico Inc., Brewster, NY (US)

( * ) Notice: Subject to any disclaimer, the term of this patent is extended or adjusted under 35 U.S.C. 154(b) by 0 days.

(21) Appl. No.: 09/692,712

(22) Filed: Oct. 19, 2000

(30) Foreign Application Priority Data

Nov. 4, 1999 (GB) .............................................. 9926006

(51) Int. Cl.⁷ ............................................... C08G 18/10
(52) U.S. Cl. .................................. 524/710; 252/182.17
(58) Field of Search ...................... 252/182.17; 524/710

(56) References Cited

U.S. PATENT DOCUMENTS

| 3,980,606 A | 9/1976 | Werner |
| 4,789,691 A | 12/1988 | Matzke et al. ............... 521/159 |
| 5,077,371 A | 12/1991 | Singh et al. .................. 528/64 |
| 5,130,402 A | 7/1992 | Akiyama et al. ............. 528/45 |
| 5,688,892 A | 11/1997 | Ishii et al. |
| 5,817,860 A | 10/1998 | Rizk et al. |
| 5,962,619 A | 10/1999 | Seneker et al. ............... 528/64 |

FOREIGN PATENT DOCUMENTS

| CA | 2096466 | 11/1993 |
| EP | 0239396 | 9/1987 |
| EP | 0 376 674 B1 | 3/1995 |
| EP | 0 739 972 A2 | 10/1996 |
| EP | 0 829 497 A1 | 3/1998 |
| JP | 06-016767 | 1/1994 |
| WO | WO 98/58979 | 12/1998 |
| WO | WO 00/35983 | 6/2000 |

OTHER PUBLICATIONS

WPI Accession No. 1990–062443[50] for JP 2014271 (1990)—Jan.

Primary Examiner—Rachel Gorr
(74) Attorney, Agent, or Firm—Lyon & Lyon LLP; Kristin H. Neuman; James H. Shalek

(57) ABSTRACT

The present invention relates to the curative component of poly urethane/urea-forming casting compositions containing (a) an aromatic polyamine containing at least one thioether group, (b) a phosphate ester and (c) an aldehyde or a compound which forms an aldehyde upon reaction with water. Component (c) prevents the composition from discoloring with time into an unacceptable dark color and also neutralises the strong odor resulting from the amine curative and its decomposition byproducts.

15 Claims, No Drawings

POLYURETHANE/POLYUREA-FORMING COMPOSITIONS

This invention relates to a curative composition for the room temperature curing of polyisocyanates, a curable composition containing said curative composition, a process for the preparation of cured polyurethanes/polyurea and the polyurethane/polyurea castings obtained by said process.

Aromatic thioether groups containing amine curatives are well known, for instance from U.S. Pat. No. 5,962,619, and are widely used in the preparation of poly urethane/urea elastomers. One of the major problems is that the aromatic thioether groups containing amines are generally very smelly on their own and, since they are not very stable to atmospheric oxygen, they have the tendency to release some even more malodorous byproducts. However, unlike other widely used aromatic amine curatives like diaminodiphenyl methane (DDM)or 4,4'-methylenebis(2-chloroaniline) (MOCA), they are not carcinogenic and therefore safer to handle. Furthermore, the colour of thioether groups containing aromatic amines is easily affected by the presence of acidic species which cause an unacceptable darkening of the composition within a couple of weeks or even hours. Such acidic species can be generated by hydrolysis of aromatic phosphate ester plasticizers present in the composition. This problem could be avoided by using, for instance, phthalate plasticizers. However, unlike the latter, phosphate ester plasticizers have the advantage of being of low viscosity and much safer to handle and they do not need any hazard labels.

It has now been found that the problems delineated above can be solved by the addition of a small amount of an aldehyde or a compound which forms an aldehyde upon reaction with water to a curative mixture containing a thioether group containing aromatic amine and a non-volatile phosphate ester plasticizer. The novel curative compositions are suitable for room temperature curing of polyisocyanates and polyisocyanate prepolymers. The discoloration and the strong malodorous smell which usually appears during application of thioether group containing aromatic amines is prevented or neutralised, respectively.

Accordingly, the present invention relates to a curative composition comprising
(a) an aromatic polyamine containing at least one thioether group,
(b) a phosphate ester having a vapor pressure of less than 2000 mPa at 25° C.,
(c) an aldehyde or a compound which forms an aldehyde upon reaction with water.

Component (a) preferably is a compound of formula Ia or Ib

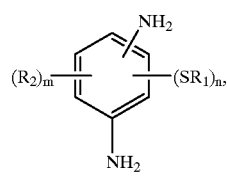

(Ia)

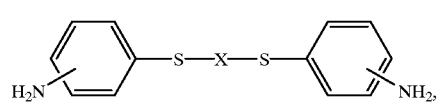

(Ib)

wherein $R_1$ and $R_2$ independently of one another denote $C_1$–$C_6$alkyl, n is an integer from 1 to 3, m is an integer from 0 to 3, with the proviso that m+n≦4, and X is a linear or branched $C_1$–$C_{12}$alkylene radical.

$R_1$ and $R_2$ in formula Ia can independently of one another be, for example, methyl, ethyl, n-propyl, isopropyl, n-butyl, t-butyl and n-hexyl.

In the preferred compounds of formula Ia $R_1$ is methyl and n is 1 or 2. Further preferred compounds of formula Ia are those wherein $R_2$ is methyl and m is 0 or 1.

Particularly preferred components (a) are compounds of formula Ia wherein $R_1$ and $R_2$ denote methyl and compounds of formula Ib, wherein X denotes ethylene.

The most preferred compounds of formula Ia and Ib are 3,5-dimethylthio-2,4-toluenediamine, 3,5-dimethylthio-2,6-toluenediamine and 1,2-bis(2-aminophenylthio)ethane.

Component (b) is preferably a compound of formula IIa, IIb or IIc

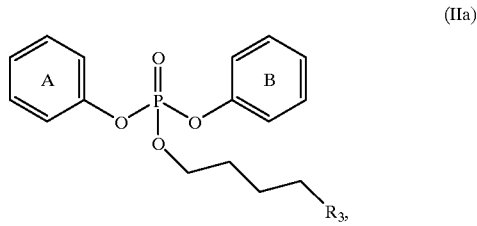

(IIa)

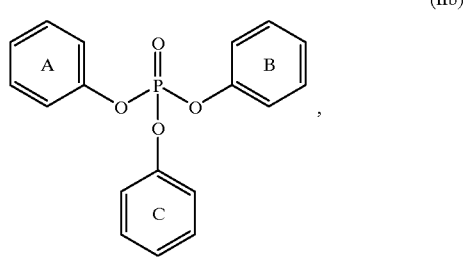

(IIb)

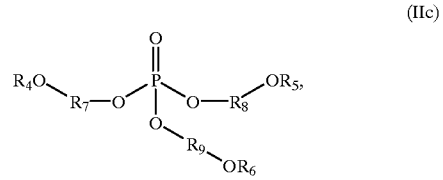

(IIc)

wherein $R_3$ is hydrogen or unsubstituted or alkyl-substituted $C_2$–$C_6$alkyl, $R_4$, $R_5$, $R_6$, independently from one another, are unsubstituted or alkyl substituted $C_1$–$C_5$ alkyl and $R_7$, $R_8$ and $R_9$ independently of one another are unsubstituted or alkyl-substituted $C_1$–$C_5$alkylene, and aromatic rings A, B and C independently of one another can have one or more alkyl substitutions.

Representative compounds falling with formula (IIa) are pentyl diphenyl phosphate, hexyl diphenyl phosphate, heptyl diphenyl phosphate, octyl diphenyl phosphate, nonyl diphenyl phosphate and $C_1$–$C_3$alkyl substituted compounds thereof, such as isodecyl diphenyl phosphate (Santicizer 148) and 2-ethylhexyl diphenyl phosphate (Santicizer 141, Solutia) and Santicizer 2148 (Solutia). Representative compounds falling with formula (IIb) are triphenyl phosphate and tricresyl phosphate. Representative compounds falling with formula (IIc) are tris(methoxymethyl)phosphate, tris(ethoxymethyl)phosphate, tris(propoxymethyl)phosphate, tris(butoxymethyl)phosphate, tris(pentoxymethyl) phosphate; tris(2-methoxyethyl)phosphate, tris(2-ethoxyethyl)phosphate, tris(2-propoxyethyl)phosphate, tris(2-butoxyethyl)phosphate, tris(2-pentoxyethyl)phosphate; tris(methoxypropyl)phosphate, tris(ethoxypropyl)

phosphate, tris(propoxypropyl)phosphate, tris(butoxypropyl)phosphate, tris(pentoxypropyl)phosphate; tris(methoxybutyl)phosphate, tris(ethoxybutyl)phosphate, tris(propoxybutyl)phosphate, tris(butoxybutyl)phosphate, tris(pentoxybutyl)phosphate; tris(methoxypentyl)phosphate, tris(ethoxypentyl)phosphate, tris(propoxypentyl)phosphate, tris(butoxypentyl)phosphate and tris(pentoxypentyl) phosphate.

Tributoxyethyl phosphate and isodecyl diphenyl phosphate are especially preferred as component (b).

Basically, any aldehyde or any compound which forms an aldehyde upon reaction with water can be employed as component (c).

Examples for suitable aldehydes are formaldehyde, paraformaldehyde, acetaldehyde, propionaldehyde, butyraldehyde, benzaldehyde, furfuraldehyde and citral. Compounds which form aldehydes upon reaction with water are primarily cyclic aminals like oxazolidines and oxazines.

In a preferred embodiment of the invention, component (c) is paraformaldehyde, benzaldehyde, citral, furfuraldehyde or an oxazolidine derivative.

Component (c) is preferably a compound of formula IIIa or IIIb

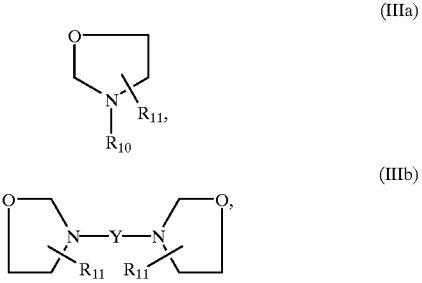

wherein $R_{10}$ denotes a monovalent organic radical containing 1 to 20 carbon atoms, $R_{11}$ is hydrogen or an unsubstituted or halogen substituted $C_1$–$C_{12}$alkyl, $C_1$–$C_{12}$alkoxy, $C_1$–$C_{12}$alkoxyalkyl, $C_5$–$C_{14}$aryl or $C_6$–$C_{20}$aralkyl and Y is a bivalent organic radical containing 1 to 30 carbon atoms.

More preferably, component (c) is a compound of formula IIIa wherein $R_{10}$ denotes an unsubstituted or halogen substituted $C_1$–$C_{12}$alkyl, $C_1$–$C_{12}$alkoxyalkyl, $C_5$–$C_{14}$aryl or $C_6$–$C_{20}$aralkyl and $R_{11}$ is hydrogen or $C_1$–$C_{12}$alkyl, or component (c) is a compound of formula IIb wherein Y is unsubstituted or halogen substituted $C_1$–$C_{20}$alkylene, —CH$_2$CH$_2$—[OCH$_2$CH$_2$]$_k$—, —CH(CH$_3$)CH$_2$—[OCH(CH$_3$)CH$_2$]$_k$— —CH$_2$CH$_2$—[OCH$_2$CH$_2$]$_p$—OCOO—[CH$_2$CH$_2$O]$_p$—CH$_2$CH$_2$— or —[CH$_2$CH$_2$]$_p$—OCOO—[CH$_2$CH$_2$]$_p$—, wherein k and p denote an integer from 1 to 10.

Oxazolidines according to formulae IIIa and IIIb are known and partly commercially available, like for instance the Incozol® series supplied by ICL.

The compounds of formula IIIa1 and IIIb1

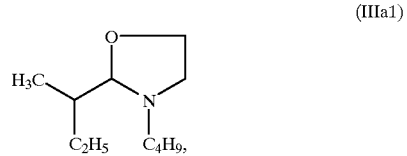

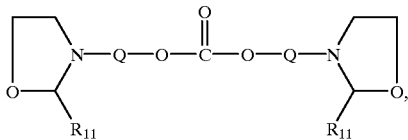

wherein $R_{11}$ is $C_1$–$C_{12}$alkyl and Q denotes $C_2$–$C_8$alkylene, are particularly preferred.

The most preferred oxazolidine is the compound of formula IIIb2, wherein Q is ethylene and $R_{11}$ is isopropyl (commercially available as Incozol® LV).

In the curative compositions according to the invention the relative amounts of components (a), (b) and (c) can vary within wide ranges. The weight ratio of components (a):(b) is preferably 0.5–10.0:1, more preferably 0.7–5.0:1 and most preferably 0.9–1.5:1. The amount of component (c) is preferably 0.01–10.0% by weight, more preferably 0.05–5% by weight and most preferably 0.1–2.0% by weight, based on the total composition (a)+(b)+(c).

Customary additives, like fillers, stabilizers, dyes, and pigments can also be incorporated in the curative compositions.

Small amounts of essential oils like pine oil can be added to give the curative compositions an agreeable odor.

In a preferred embodiment, the curative compositions additionally contain a polyether- and/or polyester-polyol.

The curative compositions according to the invention are useful for the room temperature curing of any types of isocyanate group containing monomers or prepolymers. Suitable isocyanate components are monomers or prepolymers having an average functionality of two or more isocyanate groups per molecule. Examples of suitable monomers are 2,4-toluene diisocyanate, 2,6-toluene diisocyanate, 2,3-toluene diisocyanate, 3,4-toluene diisocyanate, 4,4'-diphenylmethane diisocyanate, 2,2'-diphenylmethane diisocyanate, p-phenylene diisocyanate, isophorone diisocyanate and 4,4'-methylene-bis(cyclohexylisocyanate). Isocyanate group containing prepolymers can be prepared, for example, by reaction of a diol or polyol with an excess of diisocyanate.

A further object of the present invention is curable composition comprising a polyisocyanate component having at least two isocyanate groups per molecule and a curative composition as described above.

Aromatic polyisocyanates are well known and are widely used in the preparation of polyurethane and poly urethane/urea elastomers. These aromatic diisocyanates generally include compositions such as 2,4-toluene diisocyanate, 2,6-toluene diisocyanate, 4,4'-methylene bis (phenylisocyanate) and the like. In the preparation of polyurethane and polyurethane/urea elastomers, the aromatic diisocyanates are reacted with a long chain (high molecular weight) polyol to produce a prepolymer containing free isocyanate groups which then may be chain extended with a short chain (low molecular weight) polyol or aromatic diamine to form a polyurethane or polyurethane/urea elastomer. Long chain, high molecular weight polyols, e.g. those having a molecular weight of above 250, are generally utilized to form the prepolymer and the chain extender is generally a short chain polyol, e.g., $C_2$–$C_{10}$ polyol, or an aromatic diamine. The long chain, high molecular weight polyol provides flexibility and elastomeric properties to the resin, while the short chain polyol or aromatic diamine provides chain extension or cross-links and adds toughness and rigidity to the resulting elastomeric polymer.

A major problem with mononuclear aromatic diisocyanates, such as, toluene diisocyanate, relates to the perceived health risks and their volatility. It is known that residual toluene diisocyanate (free toluene diisocyanate) in a prepolymer mixture can be reduced by lowering the isocyanate/hydroxyl ratio of the prepolymer mixture. This modification, however, has a detrimental effect on processing when the prepolymer is chain extended (or cured), namely, the hardness build up rate decreases very significantly, which leads to an extended demolding time. The prepolymer viscosity also builds up to levels which prevent processability at ambient temperatures.

It is also known that by incorporating 2,4 toluene diisocyanate dimer into a prepolymer mix, a low NCO/OH ratio can be used to obtain the desired low residual free toluene diisocyanate content while maintaining the desired hardness build up rate. Such a composition is described in U.S. Pat. No. 5,077,371, which is incorporated herein by reference. The prepolymer's viscosity is measured at 100° C. and cured at temperatures in excess of 100° C. using 4,4'-methylene-bis(3-chloro)aniline. There is a need for a poly urethane/urea forming composition having a low free toluene diisocyanate content that is capable of being cast and cured at room temperatures.

In a preferred embodiment, a low-free toluene diisocyanate prepolymer is made by reacting an organic diisocyanate and the dimer of toluene diisocyanate with high molecular weight aliphatic polyester or polyether polyols to produce a prepolymer having a toluene diisocyanate content below 0.4% by weight. Optionally, a mixture of a low molecular weight polyol (number average molecular weight less than 250) and a high molecular weight polyol (number average molecular weight of at least 250) can also be reacted with the diisocyanate and the dimer of toluene diisocyanate.

Representative toluene diisocyanates include the two main isomers, 2,4- and 2,6-diisocyanate and optionally, a small amount of the ortho isomers, the 2,3- and 3,4-isomers. Commercially, toluene diisocyanate is found as a 65:35, 80:20 or 99:1 isomer mix of the 2,4-and 2,6-isomer by weight and optionally from 0–5% by weight of the ortho isomers. An isomer mix is preferred within a range of from about 65–100% of the 2,4-isomer and the balance (0–35%) being essentially the 2,6-isomer. The most preferred range of the 2,6-isomer is 0–5%.

The 2,4-toluene diisocyanate dimer can be added to the selected organic diisocyanate(s) in an amount ranging up to the dimer's solubility limit at about 80° C. to form an isocyanate blend. Preferably the dimer is present at about 0.3% to about 6.0% by weight of the isocyanate blend, that is, the mixture of the toluene diisocyanate dimer and the selected organic diisocyanate(s). More preferably about 0.5 to 4.0% by weight of dimer is present in the isocyanate blend.

High molecular weight polyols, particularly polyether polyols or polyester polyols having a number average molecular weight of at least 250, can be used to prepare the prepolymer of the instant invention. Polyols having a number average molecular weight of about 650 to 3000 are preferred, with polyols having number average molecular weights of 1000 being the most preferred. The number average molecular weight of the high molecular weight polyol can be as high as 10,000 or as low as 250. Preferred polyether polyols are polyalkyleneether polyols represented by the general formula HO(RO)$_n$H, wherein R is an alkylene radical and n is an integer large enough that the polyether polyol has a number average molecular weight of at least 250. These polyalkyleneether polyols are well-known components of polyurethane products and can be prepared by the polymerization of cyclic ethers such as alkylene oxides and glycols, dihydroxyethers, and the like by known methods. A particularly preferred high molecular weight polyol is polytetramethylene glycol.

Polyester polyols are prepared by reaction of dibasic acids (usually adipic acid but other components such as sebacic or phthalic acid may be present) with diols such as ethylene glycol, 1,2-propylene glycol, 1,4-butylene glycol and diethylene glycol, etc., where linear polymer segments are required, or include units of higher functionality such as glycerol, trimethylol propane, pentaerythritol, sorbitol, etc., if chain branching or ultimate cross-linking is sought. Some polyester polyols also employ caprolactone and dimerized unsaturated fatty acids in their manufacture. Another type of polyester which is of interest is that obtained by the addition polymerization of e-caprolactone in the presence of an initiator. Other polyols that can be used are those that have at least two hydroxyl groups and whose basic backbone is obtained by polymerization or copolymerization of such monomers as butadiene and isoprene monomers.

The initial polyol portion for making a prepolymer blend of the instant invention can be combination of high molecular weight polyol, as previously described, and a low molecular weight polyol. An aliphatic glycol is the preferred low molecular weight polyol. Suitable aliphatic polyols are ethylene glycol, diethylene glycol, dipropylene glycol, neopentyl glycol, 1,3-butanediol, 1,4-butanediol, and the like. The most preferred low molecular weight polyol is 1,4-butanediol. In general, the weight of the low molecular weight polyol should be no more than 20% of the combination of high molecular weight polyol and low molecular weight polyol. The preferred range is 0 to 15% of the combination; more preferred is 0–8%.

The prepolymers are prepared by dissolving 2,4-toluene diisocyanate dimer in any conventional diisocyanate, adding the polyol or initial polyol blend, maintaining the temperature at from room temperature to temperatures as high as 150° C. for sufficient time to react all of the available hydroxyl groups. Preferred reaction temperatures are 50° C. to 100° C.; more preferred temperatures are 50° C. to 85° C. The product is poured into containers under a nitrogen flush and stored at room temperature. A particularly preferred prepolymer is commercially available from Uniroyal Corporation under the tradename Adiprene® LF 750D.

An alternate method to manufacture the necessary prepolymer is to generate the dimer of toluene diisocyanate in situ. A dimerization catalyst, such as one of the trialkyl phosphines or other conventional materials, is added to toluene diisocyanate prior to adding the polyols. Another alternative is to generate the dimer in the diisocyanate by heating to the dimerization temperature without use of a catalyst.

The stoichiometric ratio of isocyanato groups to hydroxyl groups in the reactants should preferably be from 1.3/1 to 1.9/1 although somewhat lower and higher ratios are permissible. When the ratio is much lower, the molecular weight of the isocyanato terminated polyurethane becomes so large that the viscosity of the mass makes mixing of chain extenders into the prepolymer relatively more difficult. At the other extreme, a ratio of 2 isocyanato groups to one hydroxyl group is the theoretical ratio for the end-capping of a polyalkyleneether or ester polyol with a diisocyanate. An excess approaching the 2/1 ratio will result in high levels of free diisocyanate in the mixture. Therefore, the preferred range is 1.4/1 to 1.6/1.

A wide variety of fillers, dyes, and pigments can be used in the formulations described above. Examples of suitable fillers are calcium carbonate, clays, talcs, zinc oxide, titanium dioxide, and silica. The amount of filler usually is in the range of 0 to 800 parts per hundred by weight, depending on the application for which the formulation is intended.

Stabilizers known in the art can also be incorporated into the composition. The stabilizers may be for protection during the life of the finished product against, for example, oxygen, ozone, and ultra-violet radiation. Stabilizers can also be incorporated to protect against thermooxidative degradation during processing. Antioxidants and UV inhibitors that would otherwise interfere with the urethane curing process should be avoided. Preferred antioxidants are sterically hindered phenolic compounds. Stabilizers such as organic phosphites are also useful. Preferred UV inhibitors are benzotriazole compounds.

The invention further relates to a process for the preparation of a cured polyurethane or polyurea comprising reacting a polyisocyanate component having at least two isocyanate groups per molecule at a temperature between 15 and 35° C. with a curative composition as described above. The products obtained by said process are non-sweating, non-distorting castings or boards with superior elasticity, toughness, tear strength and abrasion resistance.

The following examples are illustrative of the present invention and are therefore not intended as a limitation on the scope thereof.

EXAMPLE 1

The following components are combined in a closed vessel at ambient pressure and temperature. The components are intimately mixed for a sufficient time to produce a homogenous mixture (curative component).

| | |
|---|---|
| Isodecyl diphenyl phosphate | 56.15 g |
| BYK A530 (degassing aid) | 0.40 g |
| Dimethylthiotoluene diamine | 42.1 |
| Incozol ® LV | 0.25 g |
| TiO$_2$ | 1.1 g |

Brown liquid that does not discolour with time even when reasonably exposed to atmosphere. Very acceptable odour compared to the almost unbearable odour of the same version without oxazolidine.

EXAMPLE 2

The components identified below are combined analogously to the methods described in example 1 to produce a homogenous mixture (curative component). Polyol 1 is is a ethoxylated polyol of functionality 3 and a molecular weight of 270 (Simulsol TOIE, product of the reaction of 1 mol trimethylolpropane and 3 mol ethylene oxide).

| | |
|---|---|
| Isodecyl diphenyl phosphate | 46.12 g |
| BYK A530 (degassing aid) | 0.37 g |
| Dimethylthiotoluene diamine | 47.93 |
| Polyol 1 | 5.33 g |
| Incozol ® LV | 0.25 g |

Yellow to light brown liquid that does not discolour with time even when reasonably exposed to atmosphere. Very acceptable odour compared to the almost unbearable odour of the same version without oxazolidine.

EXAMPLE 3

The components identified below are combined analogously to the methods described in example 1 to produce a homogenous mixture (curative component). Polyol 2 is a polyglycol of molecular weight 200; the mineral filler is calcined Kaolin (Polestart® 501).

| | |
|---|---|
| Isodecyl diphenyl phosphate | 37.09 g |
| BYK A530 (degassing aid) | 0.38 g |
| Dimethylthiotoluene diamine | 29.15 g |
| Polyol 2 | 2.00 g |
| Incozol ® LV | 0.25 g |
| TiO$_2$ | 13.26 g |
| Mineral filler | 17.87 g |

Yellow to brown liquid that does not discolour with time even when reasonably exposed to atmosphere. Very acceptable odour compared to the almost unbearable odour of the same version without oxazolidine.

EXAMPLE 4

The components identified below are combined analogously to the methods described in example 1 to produce a homogenous mixture (curative component).

| | |
|---|---|
| Isodecyl diphenyl phosphate | 45.42 g |
| BYK A530 (degassing aid) | 0.37 g |
| Dimethylthiotoluene diamine | 47.93 |
| Polyol 1 | 5.33 g |
| Incozol ® LV | 0.75 g |
| Pine oil | 0.20 g |

Yellow to light brown liquid that does not discolour with time even when reasonably exposed to atmosphere. Very acceptable odour compared to the almost unbearable odour of the same version without oxazolidine.

EXAMPLE 5

The components identified below are combined analogously to the methods described in example 1 to produce a homogenous mixture (curative component).

| | |
|---|---|
| Isodecyl diphenyl phosphate | 55.45 g |
| BYK A530 (degassing aid) | 0.40 g |
| Dimethylthiotoluene diamine | 42.10 |
| Incozol ® LV | 0.75 g |
| Pine oil | 0.20 g |
| TiO$_2$ | 1.10 g |

Yellow to light brown liquid that does not discolour with time even when reasonably exposed to atmosphere. Very acceptable odour compared to the almost unbearable odour of the same version without oxazolidine.

EXAMPLE 6

The components identified below are combined analogously to the methods described in example 1 to produce a homogenous mixture (curative component). Polyol 2 is a polyglycol of molecular weight 200; the mineral filler is calcined Kaolin (Polestar® 501).

| | |
|---|---|
| Isodecyl diphenyl phosphate | 36.39 g |
| BYK A530 (degassing aid) | 0.38 g |
| Dimethylthiotoluene diamine | 29.15 g |

-continued

| | |
|---|---|
| Polyol 2 | 2.00 g |
| Incozol ® LV | 0.75 g |
| Pine oil | 0.20 g |
| TiO$_2$ | 13.26 g |
| Mineral filler | 17.87 g |

Yellow to light brown liquid that does not discolour with time even when reasonably exposed to atmosphere. Very acceptable odour compared to the almost unbearable odour of the same version without oxazolidine.

What is claimed is:

1. A curative composition comprising (a) an aromatic polyamine containing at least one thioether group, (b) a phosphate ester having a vapor pressure of less than 2000 mPa at 25° C., (c) an aldehyde or a compound which forms an aldehyde upon reaction with water.

2. A composition according to claim 1 wherein component (a) is a compound of formula Ia or Ib

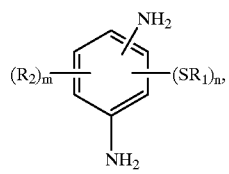

(Ia)

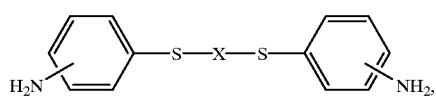

(Ib)

wherein $R_1$ and $R_2$ independently of one another denote $C_1$–$C_6$alkyl, n is an integer from 1 to 3, m is an integer from 0 to 3, with the proviso that m+n≦4, and X is a linear or branched $C_1$–$C_{12}$alkylene radical.

3. A composition according to claim 2 wherein component (a) is a compound of formula Ia wherein $R_1$ and $R_2$ denote methyl or a compound of formula Ib, wherein X denotes ethylene.

4. A composition according to claim 2 wherein component (a) is 3,5-dimethylthio-2,4-toluenediamine, 3,5-dimethylthio-2,6-toluenediamine or 1,2-bis(2-aminophenylthio)ethane.

5. A composition according to claim 1 wherein component (b) is a compound of formula IIa, IIb or IIc

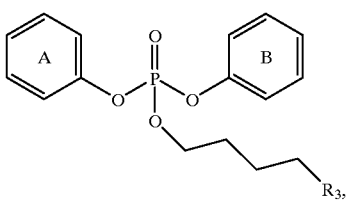

(IIa)

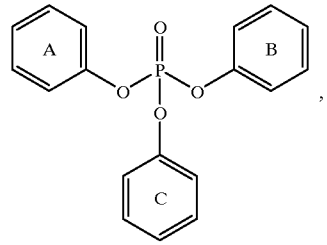

(IIb)

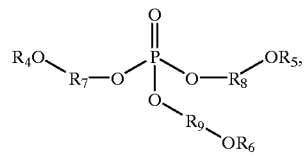

(IIc)

wherein $R_3$ is hydrogen or unsubstituted or alkyl-substituted $C_2$–$C_6$alkyl, $R_4$, $R_5$, $R_6$, independently from one another, are unsubstituted or alkyl substituted $C_1$–$C_5$ alkyl and $R_7$, $R_8$ and $R_9$ independently of one another are unsubstituted or alkyl-substituted $C_1$–$C_5$alkylene, and aromatic rings A, B and C independently of one another can have one or more alkyl substitutions.

6. A composition according to claim 1 wherein component (b) is tributoxyethyl phosphate or isodecyl diphenyl phosphate.

7. A composition according to claim 1 wherein component (c) is paraformaldehyde, benzaldehyde, citral, furfuraldehyde or an oxazolidine derivative.

8. A composition according to claim 1 wherein component (c) is a compound of formula IIIa or IIIb

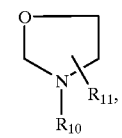

(IIIa)

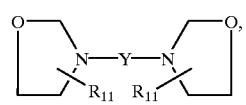

(IIIb)

wherein $R_{10}$ denotes a monovalent organic radical containing 1 to 20 carbon atoms, $R_{11}$ is hydrogen or an unsubstituted or halogen substituted $C_1$–$C_{12}$alkyl, $C_1$–$C_{12}$alkoxy, $C_1$–$C_{12}$alkoxyalkyl, $C_5$–$C_{14}$aryl or $C_6$–$C_{20}$aralkyl and Y is a bivalent organic radical containing 1 to 30 carbon atoms.

9. A composition according to claim 8 wherein component (c) is a compound of formula IIIa wherein $R_{10}$ denotes an unsubstituted or halogen substituted $C_1$–$C_{12}$alkyl, $C_1$–$C_{12}$alkoxyalkyl, $C_5$–$C_{14}$aryl or $C_6$–$C_{20}$aralkyl and $R_{11}$ is hydrogen or $C_1$–$C_{12}$alkyl, or component (c) is a compound of formula IIIb wherein Y is unsubstituted or halogen substituted $C_1$–$C_{20}$alkylene, —CH$_2$CH$_2$—[OCH$_2$CH$_2$]$_k$—, —CH(CH$_3$)CH$_2$—[OCH(CH$_3$)CH$_2$]$_k$— —CH$_2$CH$_2$—[OCH$_2$CH$_2$]$_p$—OCOO—[CH$_2$CH$_2$O]$_p$—CH$_2$CH$_2$— or —[CH$_2$CH$_2$]$_p$—OCOO—[CH$_2$CH$_2$]$_p$—, wherein k and p denote an integer from 1 to 10.

10. A composition according to claim 8 wherein component (c) is a compound of formula IIIa1 or IIIb1

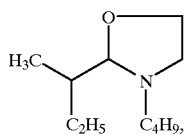
(IIIa1)

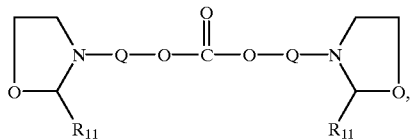
(IIIb1)

wherein $R_{11}$ is $C_1$–$C_{12}$alkyl and Q denotes $C_2$–$C_8$alkylene.

11. A curable composition comprising a polyisocyanate component having at least two isocyanate groups per molecule and a curative composition according to claim 1.

12. A curable composition according to claim 11 wherein the polyisocyanate component is a low free toluene diisocyanate prepolymer blend resulting from the reaction of 0.3 to 6.0 weight percent of a dimer of 2,4-toluene diisocyanate with 94 to 99.7% weight percent of an organic diisocyanate.

13. A curable composition according to claim 12 wherein the polyisocyanate component is a prepolymer blend that is a reaction product of an organic diisocyanate and polytetramethylene glycol.

14. A process for the preparation of a cured polyurethane or polyurea comprising reacting a polyisocyanate component having at least two isocyanate groups per molecule at a temperature between 15 and 35° C. with a curative composition according to claim 1.

15. A polyurethane or polyurea casting obtained by a the process according to claim 14.

* * * * *